(12) United States Patent
Wang et al.

(10) Patent No.: US 10,365,725 B2
(45) Date of Patent: Jul. 30, 2019

(54) PORTABLE COMPUTER KEYBOARD

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Ning-Hua Wang, Shenzhen (CN); Zhi-Bai Su, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/809,172

(22) Filed: Nov. 10, 2017

(65) Prior Publication Data

US 2019/0094986 A1    Mar. 28, 2019

(30) Foreign Application Priority Data

Sep. 27, 2017   (CN) .......................... 2017 1 0891631

(51) Int. Cl.
*G06F 3/02*    (2006.01)
*G06F 1/16*    (2006.01)

(52) U.S. Cl.
CPC .......... *G06F 3/0221* (2013.01); *G06F 1/1671* (2013.01)

(58) Field of Classification Search
CPC .... G06F 1/1624; G06F 1/1671; G06F 1/1679; G06F 3/0221
See application file for complete search history.

(56) References Cited

U.S. PATENT DOCUMENTS

| | | | | |
|---|---|---|---|---|
| 4,600,255 A * | 7/1986 | Dubarko | ................. | E05B 65/46 108/143 |
| 5,287,245 A * | 2/1994 | Lucente | ................. | G06F 1/1616 292/163 |
| 5,341,154 A * | 8/1994 | Bird | ........................ | G06F 1/162 345/167 |
| 5,966,284 A * | 10/1999 | Youn | ..................... | G06F 1/1616 361/679.17 |
| 6,111,527 A * | 8/2000 | Susel | .................... | G06F 3/0221 341/20 |
| 6,205,021 B1 * | 3/2001 | Klein | ..................... | G05G 9/047 345/167 |
| 6,212,066 B1 * | 4/2001 | Fetterman | ............. | G06F 1/1616 248/917 |

(Continued)

*Primary Examiner* — Adrian S Wilson
(74) *Attorney, Agent, or Firm* — ScienBiziP, P.C.

(57) ABSTRACT

A travel-proofed portable computer keyboard with keys sealed against dust and minor impacts includes an alphanumeric keyboard, a numeric keypad, and a first locking mechanism. The alphanumeric keyboard includes an open cavity. The numeric keypad is received in or protruding from the cavity. The numeric keypad includes a first notch and a second notch. The first locking mechanism includes an engaging member which can lock the numeric keypad in place. The numeric keypad is held in the cavity of the alphanumeric keyboard when the engaging member engages the first notch of the numeric keypad, thereby facilitating the carrying of the computer keyboard. The numeric keypad is held to protrude from the cavity of the alphanumeric keyboard when the engaging member engages the second notch of the numeric keypad, thereby enabling the use of the computer keyboard.

15 Claims, 8 Drawing Sheets

(56) References Cited

U.S. PATENT DOCUMENTS

| | | | | |
|---|---|---|---|---|
| 6,266,234 B1* | 7/2001 | Leman | G06F 1/1615 | 312/208.4 |
| 6,307,745 B1* | 10/2001 | Liebenow | G06F 1/1616 | 361/679.41 |
| 6,369,798 B1* | 4/2002 | Yatsu | G06F 1/1616 | 345/158 |
| 6,445,579 B1* | 9/2002 | Singleton, Jr. | G06F 1/1616 | 248/65 |
| 6,476,795 B1* | 11/2002 | Derocher | G06F 1/1616 | 320/114 |
| 6,538,880 B1* | 3/2003 | Kamijo | G06F 1/1616 | 248/65 |
| 6,697,251 B1* | 2/2004 | Aisenberg | G06F 1/1616 | 248/118.1 |
| 6,757,159 B2* | 6/2004 | Zarek | G06F 1/1616 | 108/43 |
| 6,781,823 B1* | 8/2004 | Nyack | G06F 1/1601 | 346/145 |
| 7,330,923 B2* | 2/2008 | Wenstrand | G06F 1/1616 | 345/156 |
| 7,654,459 B2* | 2/2010 | Orsley et al. | G06F 1/1616 | 235/427 |
| 8,238,084 B2* | 8/2012 | Chen | G06F 1/1616 | 361/679.14 |
| 8,310,823 B2* | 11/2012 | Stoltz | G06F 1/1616 | 361/679.08 |
| 2002/0126441 A1* | 9/2002 | Kuo | G06F 1/1616 | 361/679.09 |
| 2003/0011972 A1* | 1/2003 | Koo et al. | G06F 1/1616 | 361/679.27 |
| 2003/0147205 A1* | 8/2003 | Murphy | G06F 1/1616 | 361/679.16 |
| 2004/0080899 A1* | 4/2004 | Hill | G06F 1/1616 | 361/679.1 |
| 2005/0018391 A1* | 1/2005 | Jin | G06F 1/1616 | 361/679.4 |
| 2007/0076379 A1* | 4/2007 | Hong | G06F 1/1613 | 361/728 |
| 2008/0144262 A1* | 6/2008 | Lai | G06F 1/1616 | 361/679.17 |
| 2009/0190295 A1* | 7/2009 | Chin et al. | G06F 1/1618 | 361/679.27 |
| 2010/0149741 A1* | 6/2010 | Liu | G06F 1/1613 | 361/679.08 |

* cited by examiner

PORTABLE COMPUTER KEYBOARD

CROSS REFERENCE TO RELATED APPLICATION

This application claims priority to Chinese Patent Application No. 201710891631.0, filed on Sep. 27, 2017, the disclosure of which is incorporated herein by reference in its entirety.

FIELD

The present disclosure relates to computer keyboards, and more particularly to a portable computer keyboard.

BACKGROUND

A conventional computer keyboard includes an alphanumeric keyboard and a numeric keypad next to it. However, the conventional computer keyboard is too long and is not easy to carry. In addition, the conventional computer keyboard is not dust-proof.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

Figure 1:
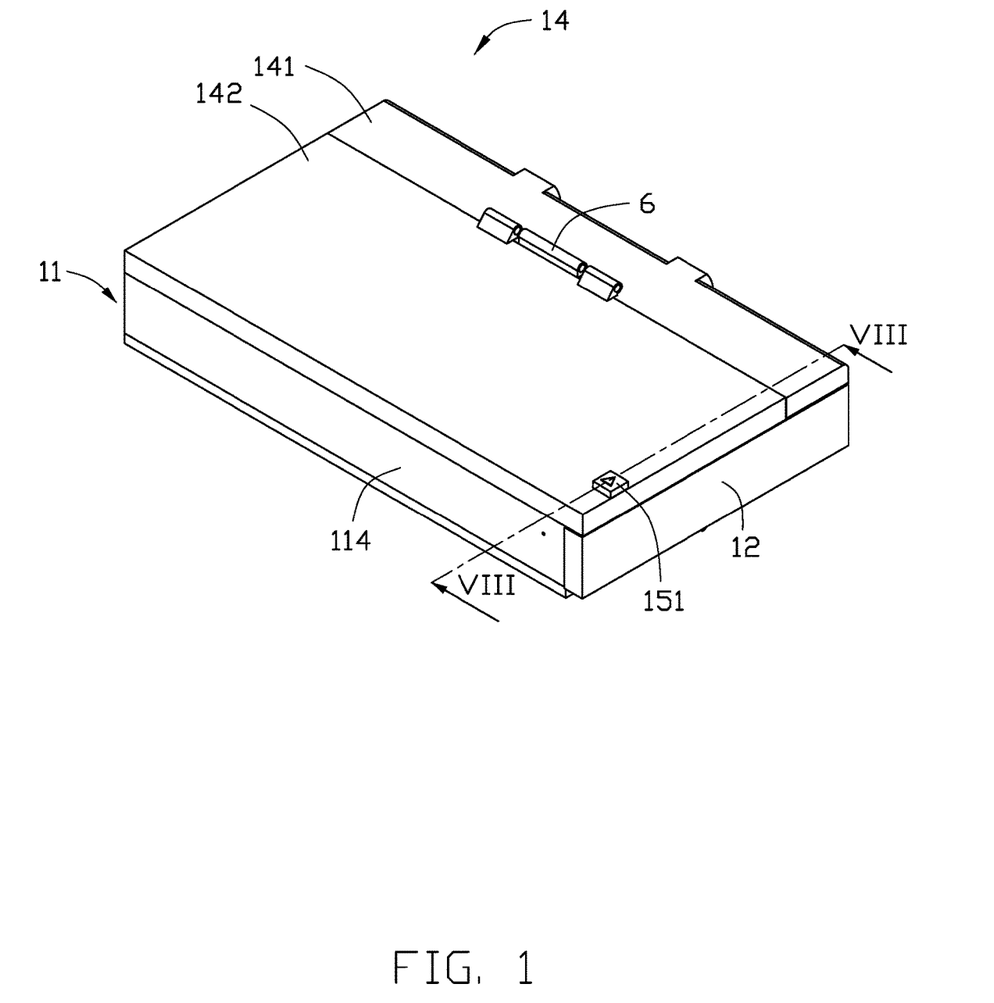
FIG. 1 is a schematic top front perspective view of a portable computer keyboard showing a cover over an alphanumeric keyboard.
Figure 2:
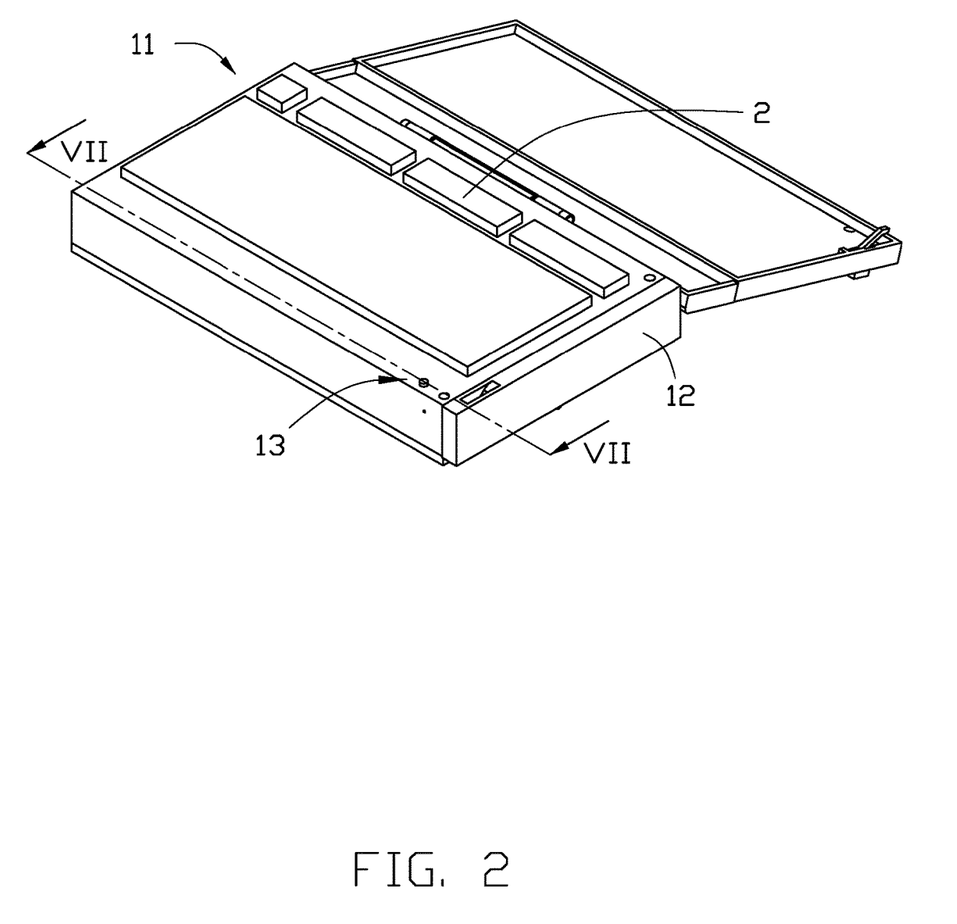
FIG. 2 is a schematic top front perspective view of the portable computer keyboard of FIG. 1 showing the alphanumeric keyboard uncovered.
Figure 3:
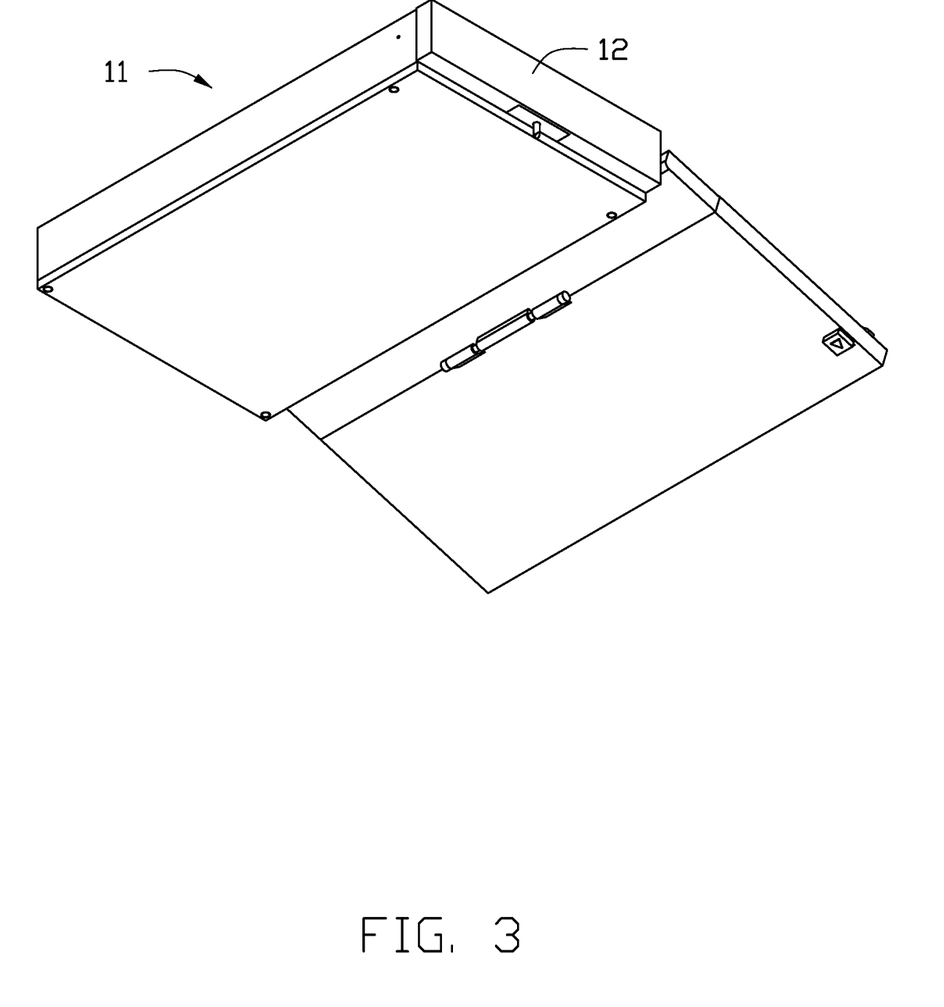
FIG. 3 is a schematic bottom front perspective view of the portable computer keyboard of FIG. 1 showing the alphanumeric keyboard uncovered.

With reference to FIGS. 1-3, an exemplary embodiment of a portable computer keyboard includes an alphanumeric keyboard 11, a numeric keypad 12, and a first locking mechanism 13.

Figure 4:
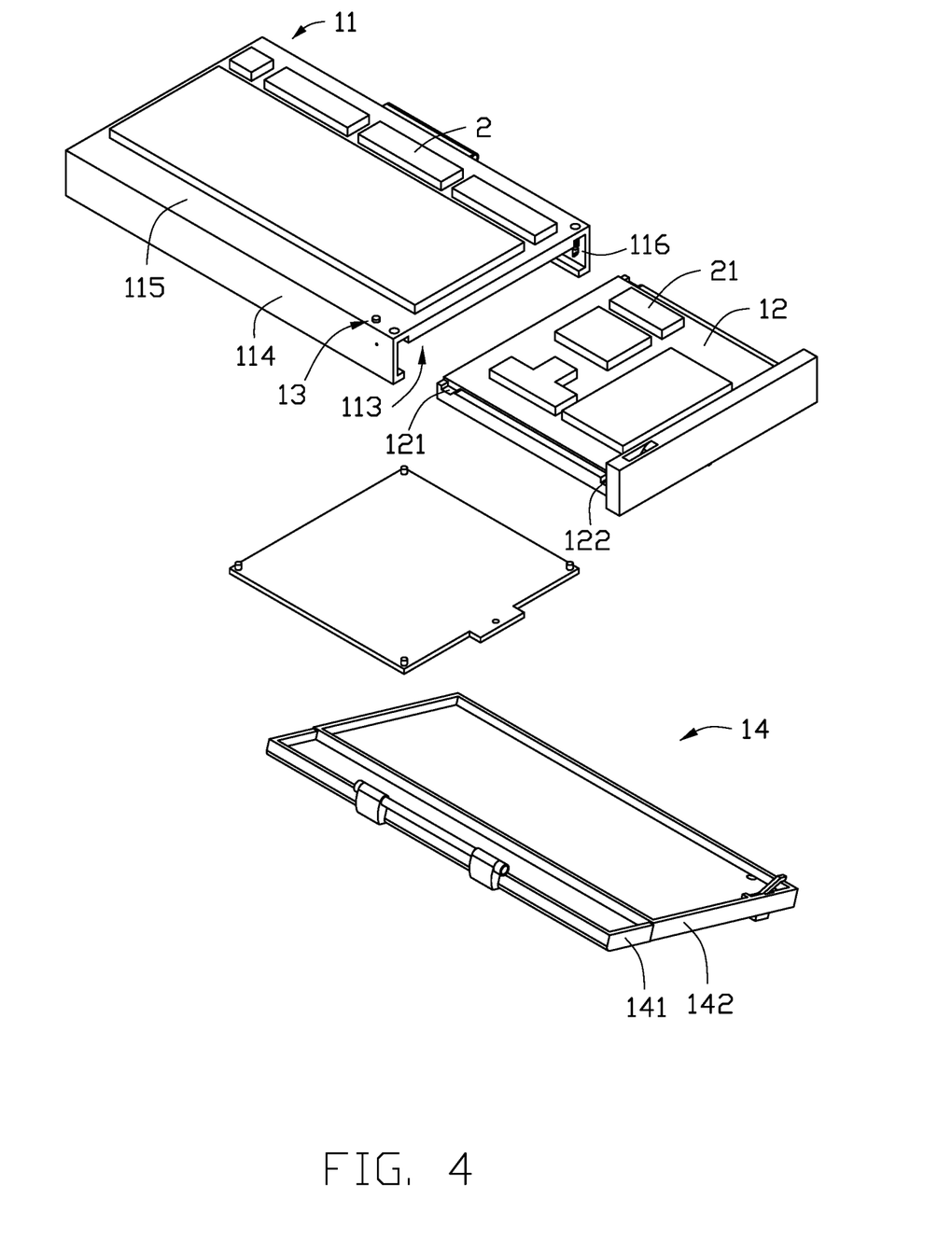
FIG. 4 is a schematic exploded top front perspective view of the portable computer keyboard of FIG. 1.
Figure 5:
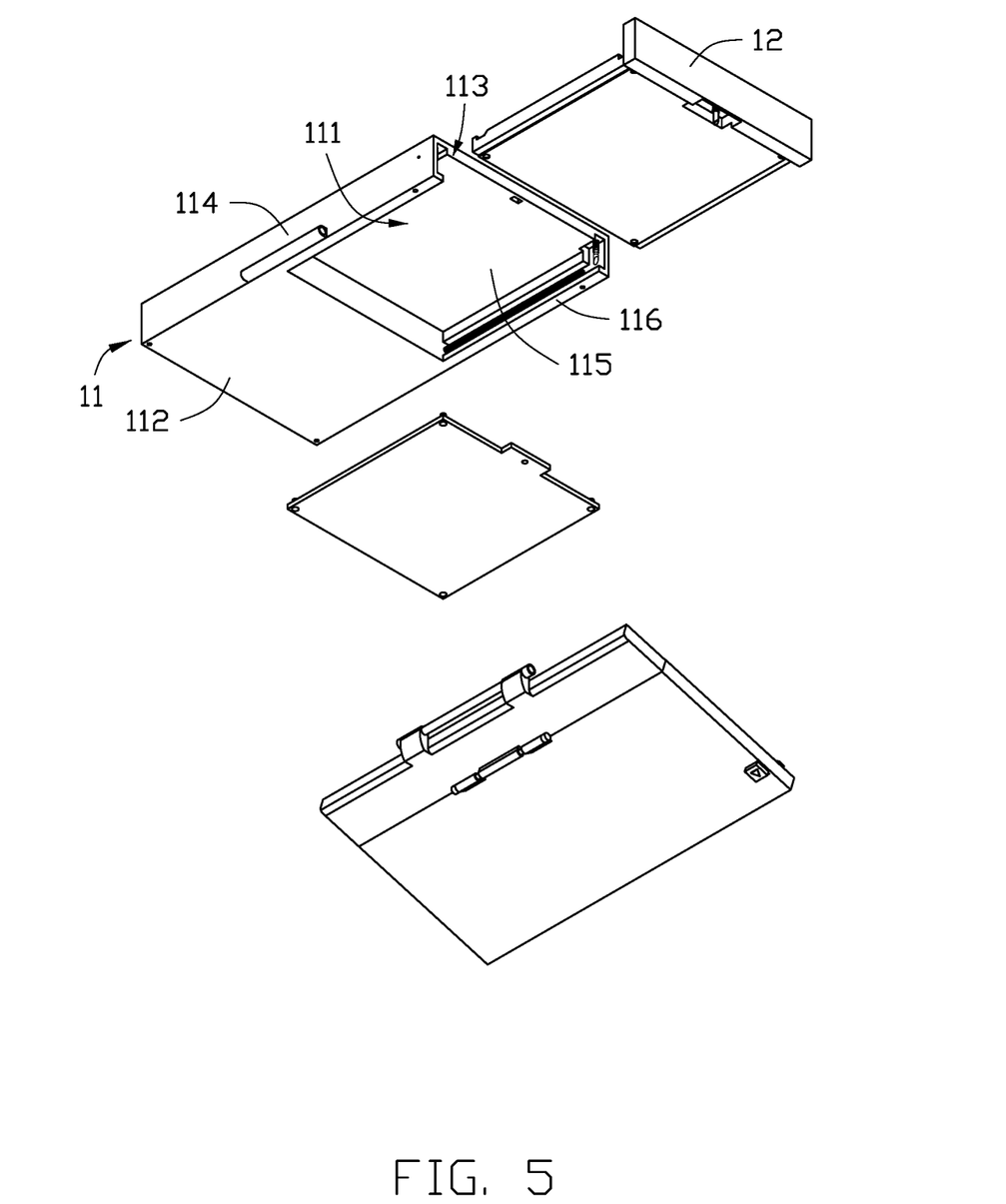
FIG. 5 is a schematic exploded bottom front perspective view of the portable computer keyboard of FIG. 1.

With further reference to FIGS. 4 and 5, the alphanumeric keyboard 11 includes a front wall 114, a rear wall 116, a top wall 115, a side portion 112, a cavity 111, and a plurality of alphanumeric keys 2. The cavity 111 is defined between the front wall 114, the rear wall 116, the top wall 115, and the side portion 112. The cavity 111 has an opening 113 opposed to the side portion 112. The alphanumeric keys 2 are located on the top wall 115.

The numeric keypad 12 is movable between a first position received in the cavity 111 of the alphanumeric keyboard 11 and a second position protruding from the opening 113 of the cavity 111 of the alphanumeric keyboard 11. The numeric keypad 12 includes a plurality of numeric keys 21, a first notch 121, and a second notch 122.

Figure 6:
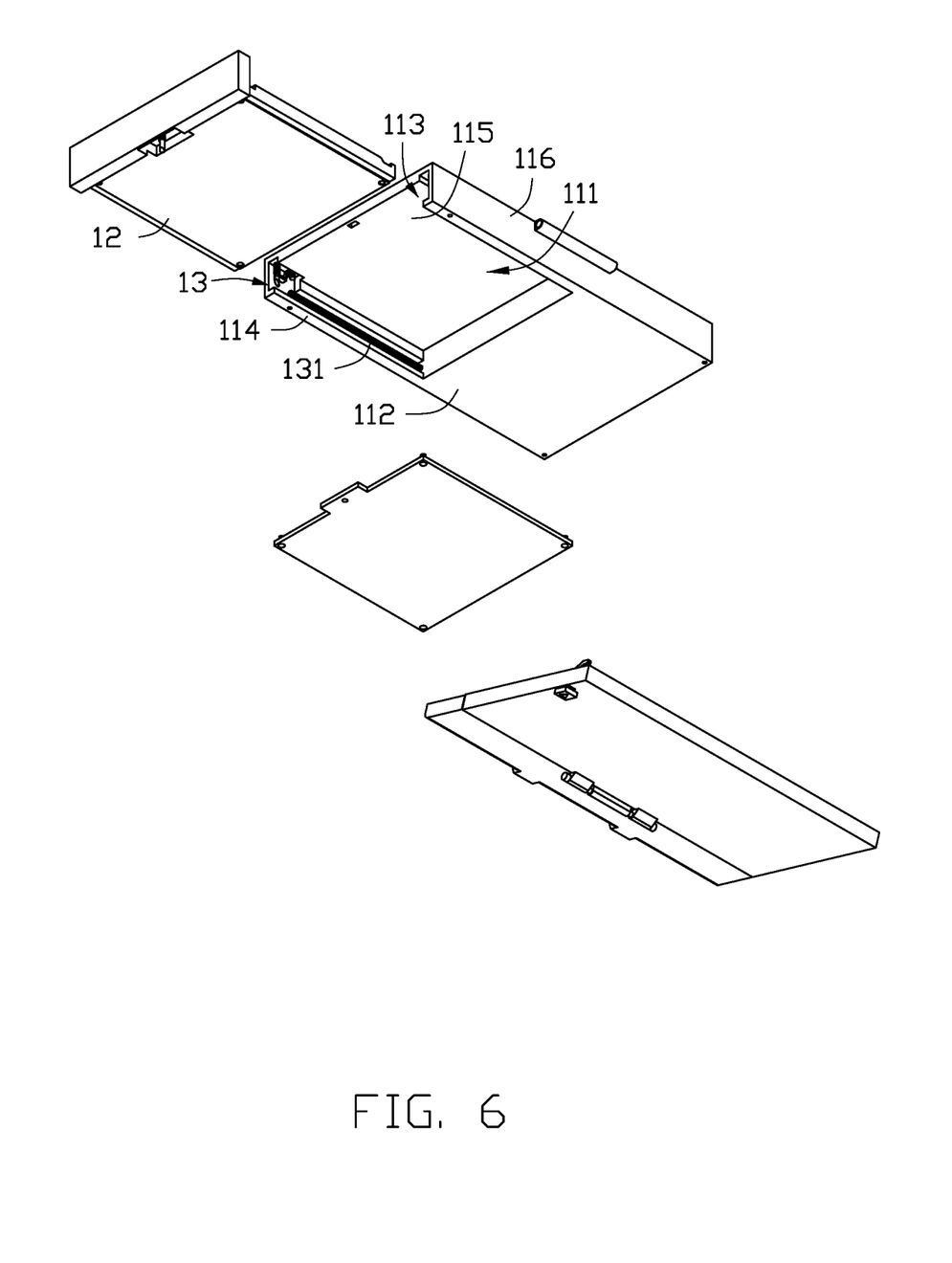
FIG. 6 is a schematic exploded bottom rear perspective view of the portable computer keyboard of FIG. 1.
Figure 7:
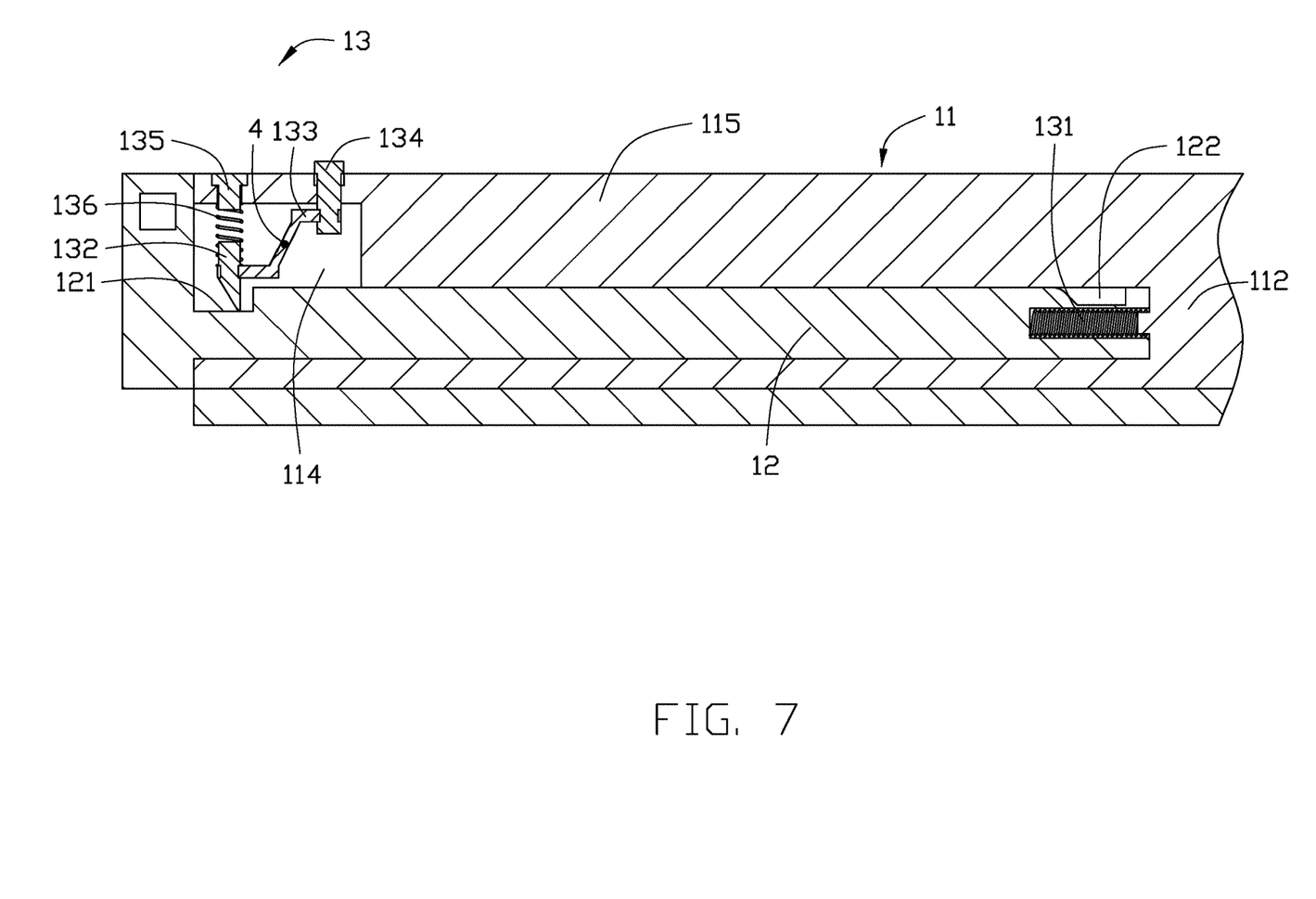
FIG. 7 is an enlarged schematic cross-section taken along line VII-VII of FIG. 2.

With reference to FIGS. 6 and 7, the first locking mechanism 13 is used to lock the numeric keypad 12 in either of the first or second positions. The first locking mechanism 13 includes a compression spring 131, a mounting member 135, a first resilient member 136, an engaging member 132, a lever 133, and a button 134. The compression spring 131 has a first end and a second end. The first end of the compression spring 131 is attached to the side portion 112 of the alphanumeric keyboard 11 and the second end is attached to a receiving hole of the numeric keypad 12. The mounting member 135 is secured to the top wall 115 of the alphanumeric keyboard 11. The engaging member 132 is connected to the mounting member 135 by the first resilient member 136. The first resilient member 136 provides a resilient force to the engaging member 132 such that the engaging member 132 engages the first notch 121 or the second notch 122 of the numeric keypad 12. The lever 133 is pivotally connected to the front wall 114 of the alphanumeric keyboard 11 by a pivot 4. The lever 133 has two ends, one end of the lever 133 is connected to the engaging member 132 and the other end is connected to the button 134. The lever 133 may be Z-shaped. The button 134 is movable through the top wall 115 of the alphanumeric keyboard 11. The button 134 has an end which can protrude from the top wall 115 of the alphanumeric keyboard 11. The end of the button 134 can be pressed to pivot the lever 133 to disengage the engaging member 132 from the first notch 121 or the second notch 122 of the numeric keypad 12.

When the engaging member 132 engages the first notch 121 of the numeric keypad 12, the numeric keypad 12 is firmly held in the cavity 111 of the alphanumeric keyboard 11 and the compression spring 131 is compressed, thereby facilitating the carrying of the computer keyboard. When the engaging member 132 engages the second notch 122 of the numeric keypad 12, the numeric keypad 12 is held so as to protrude from the cavity 111 of the alphanumeric keyboard 11 and the compression spring 131 is released, thereby facilitating the use of the computer keyboard. When the engaging member 132 is disengaged from the first notch 121 or the second notch 122 of the numeric keypad 12, the numeric keypad 12 is unlocked from the alphanumeric keyboard 11.

Figure 8:
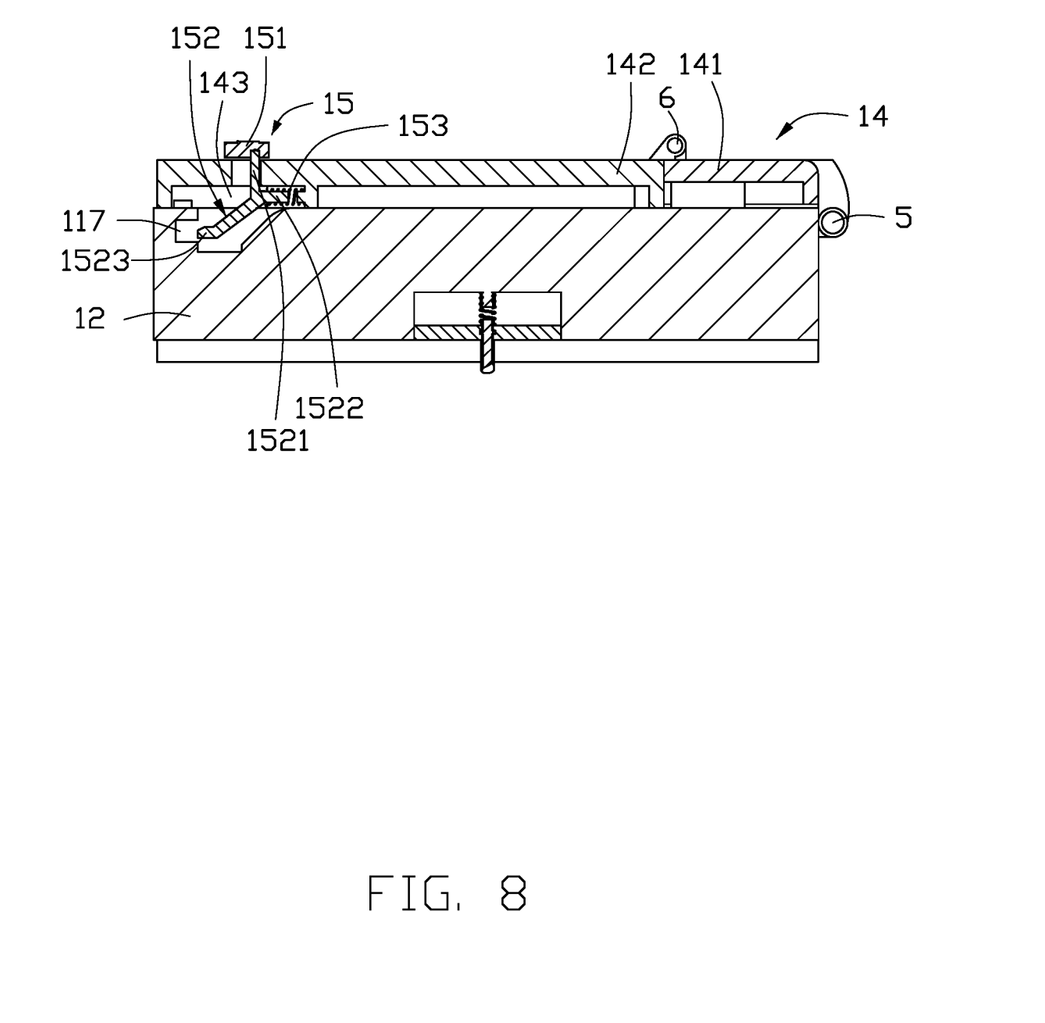
FIG. 8 is an enlarged schematic cross-section taken along line VIII-VIII of FIG. 1 showing an operating member by which the cover is released.

With reference to FIGS. 1 and 8, the portable computer keyboard further includes a cover 14 and a second locking mechanism 15, and the numeric keypad 12 further includes a locking recess 117.

The cover 14 is pivotally connected to the alphanumeric keyboard 11. The cover 14 includes a first cover portion 141, a second cover portion 142, and a guide recess 143. The first cover portion 141 is hinged to the rear wall 116 of the alphanumeric keyboard 11 by a first hinge 5. The second cover portion 142 is hinged to the first cover portion 141 by a second hinge 6. The guide recess 143 extends through the second cover portion 142.

The second locking mechanism 15 is used to lock the cover 14 in a position covering the alphanumeric keyboard 11. The second locking mechanism 15 includes a moving member 152, a second resilient member 153, and an operating member 151. The moving member 152 is Y-shaped and has an operating arm 1521, an abutting arm 1522, and a latch arm 1523. The operating arm 1521 is movable along the guide recess 143 of the cover 14. The operating arm 1521 has an outer end protruding from the cover 14. The second resilient member 153 is disposed in the guide recess 143 of the cover 14. The second resilient member 153 provides a resilient force to the abutting arm 1522 such that the latch arm 1523 engages the locking recess 117 of the numeric keypad 12. The operating member 151 is mounted on the outer end of the operating arm 1521. The operating member 151 can be moved in a direction away from the locking recess 117 of the numeric keypad 12 to cause the latch arm 1523 to disengage from the locking recess 117 of the numeric keypad 12.

When the latch arm 1523 engages the locking recess 117 of the numeric keypad 12, the cover 14 covers the alphanumeric keyboard 11 and the second resilient member 153 is released. The alphanumeric keyboard 11 is thereby rendered dust-proof. When the latch arm 1523 is disengaged from the locking recess 117 of the numeric keypad 12, the cover 14 is unlocked from the alphanumeric keyboard 11 and the second resilient member 153 is compressed such that the first cover portion 141 and the second cover portion 142 of the cover 14 can pivot to serve as a brace supporting the alphanumeric keyboard 11.

The exemplary embodiments shown and described above are only examples. Many details are often found in the art such as the other features of a computer keyboard. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A portable computer keyboard comprising:
    an alphanumeric keyboard comprising a cavity with an opening;
    a numeric keypad movable between a first position received in the cavity of the alphanumeric keyboard and a second position protruding from the opening of the cavity of the alphanumeric keyboard, the numeric keypad comprising a first notch and a second notch; and
    a first locking mechanism configured to lock the numeric keypad in either of the first or second positions, the first locking mechanism comprising:
        a compression spring having:
            a first end attached to the alphanumeric keyboard; and
            a second end attached to the numeric keypad; and
        an engaging member;
    wherein when the engaging member engages the first notch of the numeric keypad, the numeric keypad is locked in the first position and the compression spring is compressed;
    wherein when the engaging member engages the second notch of the numeric keypad, the numeric keypad is locked in the second position and the compression spring is released;
    wherein the first locking mechanism further comprises:
        a button;
        a first resilient member; and
        a lever pivotally connected to the alphanumeric keyboard, and the lever having two ends, one end connected to the engaging member and the other end connected to the button;
    wherein the button is movable through the alphanumeric keyboard, and the button has an end which can protrude from the alphanumeric keyboard; and
    wherein the engaging member is connected to the alphanumeric keyboard by the first resilient member.

2. The portable computer keyboard of claim 1,
    wherein the first locking mechanism further comprises a mounting member secured to the alphanumeric keyboard; and
    wherein the first resilient member is connected to the alphanumeric keyboard by the mounting member.

3. The portable computer keyboard of claim 1,
    wherein the alphanumeric keyboard further comprises a front wall, a rear wall, a top wall, and a side portion;
    wherein the cavity is defined between the front wall, the rear wall, the top wall, and the side portion; and
    wherein the opening of the cavity is opposite to the side portion.

4. The portable computer keyboard of claim 3,
    wherein the first end of the compression spring is attached to the side portion of the alphanumeric keyboard;
    wherein the lever is pivotally connected to the front wall of the alphanumeric keyboard by a pivot; and
    wherein the button is movable through the top wall of the alphanumeric keyboard, and the end of the button can protrude from the top wall of the alphanumeric keyboard.

5. The portable computer keyboard of claim 1, further comprising:
    a cover pivotally connected to the alphanumeric keyboard; and
    a second locking mechanism configured to lock the cover in a position covering the alphanumeric keyboard.

6. The portable computer keyboard of claim 2, further comprising:
    a cover pivotally connected to the alphanumeric keyboard; and
    a second locking mechanism configured to lock the cover in a position covering the alphanumeric keyboard.

7. The portable computer keyboard of claim 3, further comprising:
    a cover pivotally connected to the alphanumeric keyboard; and a second locking mechanism configured to lock the cover in a position covering the alphanumeric keyboard.

8. The portable computer keyboard of claim 5,
wherein the numeric keypad further comprises a locking recess;
wherein the cover has a guide recess;
wherein the second locking mechanism comprises:
  a moving member; and
  an operating member attached to the moving member and movable along the guide recess of the cover; and
wherein when the moving member engages the locking recess of the numeric keypad, the cover is held to cover the alphanumeric keyboard.

9. The portable computer keyboard of claim 6,
wherein the numeric keypad further comprises a locking recess;
wherein the cover has a guide recess;
wherein the second locking mechanism comprises:
  a moving member; and
  an operating member attached to the moving member and movable along the guide recess of the cover; and
wherein when the moving member engages the locking recess of the numeric keypad, the cover is held to cover the alphanumeric keyboard.

10. The portable computer keyboard of claim 7,
wherein the numeric keypad further comprises a locking recess;
wherein the cover has a guide recess;
wherein the second locking mechanism comprises:
  a moving member; and
  an operating member attached to the moving member and movable along the guide recess of the cover; and
wherein when the moving member engages the locking recess of the numeric keypad, the cover is held to cover the alphanumeric keyboard.

11. The portable computer keyboard of claim 8,
wherein the second locking mechanism further comprises a second resilient member; and
wherein the moving member is connected to the cover by the second resilient member.

12. The portable computer keyboard of claim 9,
wherein the second locking mechanism further comprises a second resilient member; and
wherein the moving member is connected to the cover by the second resilient member.

13. The portable computer keyboard of claim 10,
wherein the second locking mechanism further comprises a second resilient member; and
wherein the moving member is connected to the cover by the second resilient member.

14. The portable computer keyboard of claim 5, wherein the cover comprises:
  a first cover portion hinged to the alphanumeric keyboard by a first hinge; and
  a second cover portion hinged to the first cover portion by a second hinge.

15. The portable computer keyboard of claim 6, wherein the cover comprises:
  a first cover portion hinged to the alphanumeric keyboard by a first hinge; and
  a second cover portion hinged to the first cover portion by a second hinge.

* * * * *